Oct. 14, 1952 — D. D. BROOKS — 2,613,444
MEASURING RULE WITH OPPOSED SLIDING CONTACTS
Filed July 23, 1947 — 2 SHEETS—SHEET 1

Inventor
David D. Brooks

Oct. 14, 1952      D. D. BROOKS      2,613,444
MEASURING RULE WITH OPPOSED SLIDING CONTACTS
Filed July 23, 1947      2 SHEETS—SHEET 2

Inventor
David D. Brooks

By Clarence A. O'Brien
and Harvey B. Jackson
Attorneys

Patented Oct. 14, 1952

2,613,444

UNITED STATES PATENT OFFICE 2,613,444

MEASURING RULE WITH OPPOSED SLIDING CONTACTS

David D. Brooks, Union City, Ohio

Application July 23, 1947, Serial No. 763,136

3 Claims. (Cl. 33—147)

The present invention relates to new and useful improvements in measuring instruments and more particularly to a rule embodying means for reading small fractions with greater accuracy.

An important object of the present invention is to provide a device of this character which may be conveniently used for performing the functions of a rule as well as calipers for obtaining direct reading of small fractions on a dial and in which the graduations on the dial are displayed in such a size as to easily determine the reading without eye strain and to reduce the margin of error in the use of an instrument of this character.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
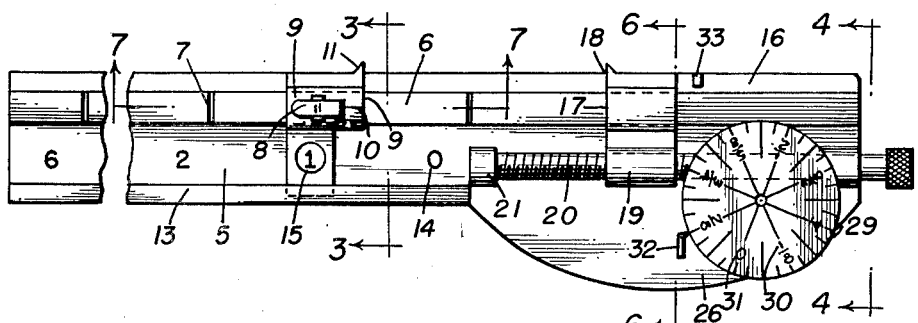
Figure 1 is a top plan view illustrating one embodiment of the invention.
Figure 2:
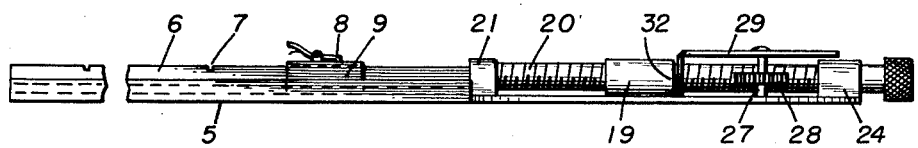
Figure 2 is a side elevational view thereof.
Figure 3:
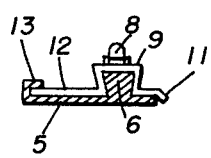
Figure 3 is a transverse sectional view taken on a line 3—3 of Figure 1.
Figure 4:
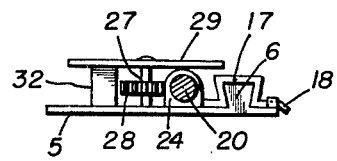
Figure 4 is a similar view taken on a line 4—4 of Figure 1.
Figure 5:
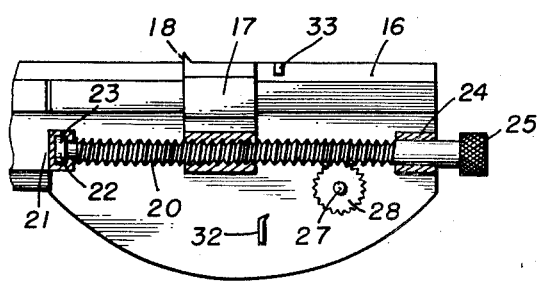
Figure 5 is a fragmentary top plan view with the dial removed and with parts shown in section.
Figure 6:
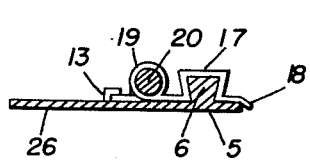
Figure 6 is a transverse sectional view taken on a line 6—6 of Figure 1.
Figure 7:
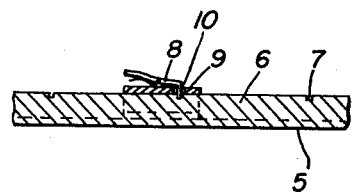
Figure 7 is a fragmentary longitudinal sectional view taken on a line 7—7 of Figure 1.

Referring now to the drawings in detail and first with respect to the form of invention illustrated in Figures 1-6 inclusive, the numeral 5 designates the elongated rule body having a longitudinally extending dove-tail shaped rib 6 on its upper surface and adjacent one edge of the body. The upper surface of the rib 6 is formed with transverse grooves 7 spaced equidistantly from each other at one inch intervals and in which a spring-actuated pivoted dog 8 carried by a slide 9 is engaged to hold the slide in a set position on the body 5.

The slide 9 conformably fits on the rib 6 and is formed with an opening 10 through which the dog 8 works to provide access to the grooves 7. One edge of the slide is formed with a pointer 11 which is bent downwardly over the edge of the body adjacent the rib 6 and the other end of the slide is disposed flatly on the body 5 and is slidable in a channel 13 at the opposite edge of the body.

The surface of the body 5 adjacent the channel 13 is provided with graduations 14 denoting inches and the end portion 12 of the slide is provided with a sight opening 15 in which one of the graduations appears when the dog 8 is engaged in one of the grooves 7. The graduations 14 read from zero from a point inwardly from one end portion 16 of the body upwardly toward an opposite end of the body in accordance with the length of the body.

The rib 6 extends along the end portion 16 of the body on which is slidably mounted a second slide 17 also provided at one edge with a pointer 18 cooperating with the pointer 11 by a movement of the pointers toward and away from each other when moved longitudinally of the body.

The opposite edge of the slide 17 is formed with an internally threaded sleeve 19 in which a feed screw 20 is threadedly engaged, the screw being positioned longitudinally of the body 5 with its inner end journaled in a bearing 21 formed with an annular chamber 22 in which a flange 23 carried on the end of the screw is rotatable and held against endwise movement. The outer end of the screw is smooth and journaled in a bearing 24, the smooth end of the screw projecting outwardly from the adjacent end of the body and formed with a knurled knob 25.

The end portion 16 of the body at its edge opposite from the rib 6 is formed with a laterally enlarged plate 26 having a vertical shaft 27 journaled therein and on which is secured a gear or pinion 28 operatively engaged with the screw 20. A circular dial plate 29 is secured to the upper end of the shaft 27 having graduations 30 provided on its upper surface and at the peripheral edge thereof. The diameter of the dial 29 is several times greater than that of the gear or pinion 28 and the graduations 30 read from a zero setting 31 in fractions of an inch in a circumferential direction on the scale. A stationary pointer 32 rises from the plate 26 for use with the graduations 30.

In the operation of the device, the work is measured between the pointers 11 and 18 and where the measurement involves one or more inches and a fraction thereof the slide 9 is moved toward the left on the rule body 5 to a position on the scale 14 corresponding to the complete inches of the measurement and the slide 17 is moved toward the right away from the slide 9 by the manipulation of the screw 20 until the desired fraction of an inch of the graduation 30 registers with the pointer 32 whereupon the pointers 11 and 18 will be spaced apart a distance corresponding to the desired measurement.

A stop 33 carried by the end portion 16 of the rule body is positioned in the path of movement of the slide 17 to limit the outward movement of the slide.

By constructing the dial plate 29 of a circumference greater than the gear 28, the graduations 30 will be spaced from each other a distance sufficient to enable the same to be easily and accurately read.

Figure 8:
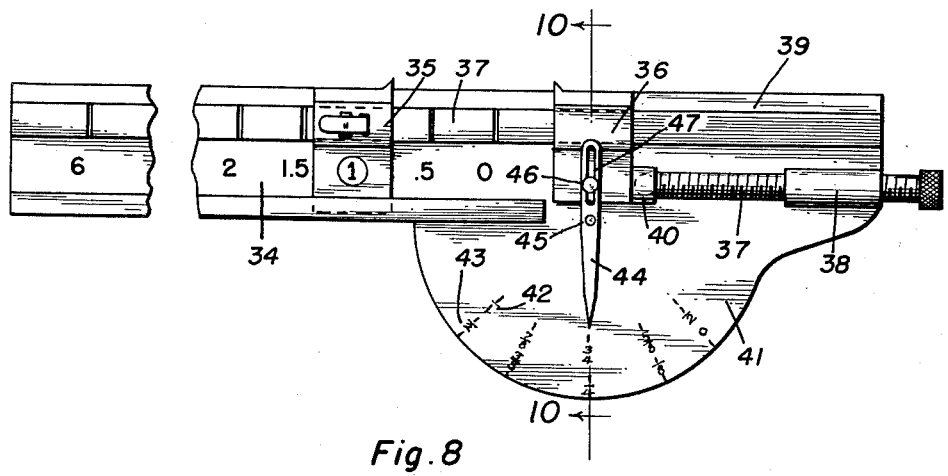
Figure 8 is a top plan view illustrating a modified construction.
Figure 9:
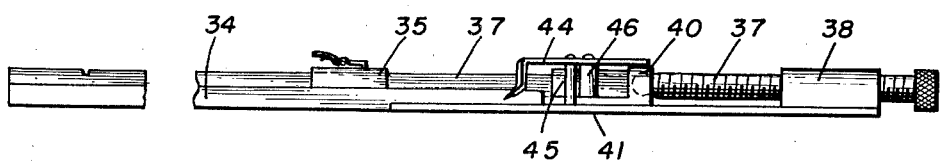
Figure 9 is a side elevational view thereof.
Figure 10:
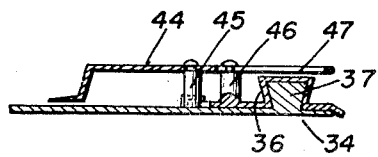
Figure 10 is a transverse sectional view taken on a line 10—10 of Figure 8.

In the form of invention illustrated in Figures 8–10 inclusive, the rule body is shown at 34 with the inch slide shown at 35 and the fraction of an inch slide shown at 36 both slidable on the rib 37 as heretofore described.

A feed screw 37 is threaded through an internally threaded sleeve 38 fixed to the end portion 39 of the body and the inner end of the screw is connected to the slide 36 by a ball and socket construction 40 to slidably actuate the slide 36 by the manipulation of the screw.

A dial plate 41 projects from the rear edge portion of the end 39 of the body and on which inner and outer circularly arranged graduations 42 and 43 are provided, the outer graduations reading in fractions of an inch from zero to one-half and the inner graduations reading in fractions of an inch from one-half to one inch.

A pointer 44 is pivoted intermediate its ends on a pin 45 rising from the plate 41 for the movement of its outer end across the graduations 42 and 43. A pin 46 rises from the slide 36 in the longitudinal slot 47 in the rear end of the pointer to actuate the pointer in a back and forth movement by the sliding action of the slide 36.

The movement of the slide 36 actuates the pointer 44 to register the movement of the slide in fractions of an inch on the graduations 42 and 43 and the outer end of the pointer is constructed of an increased length whereby its movement is greater than that of the slide to thus enable a more accurate reading of the fractions of an inch measured by the movement of the slide 36.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A measuring device comprising a flat elongated rule body having a longitudinal rib on its upper surface and a longitudinal channeled guide at one edge also on its upper surface and parallel to the rib, said body having a scale on its upper surface between the rib and guide, a pair of slides mounted on the rib, a lateral extension on one of the slides having a sight opening selectively registering with the indicia of the scale and also having its outer edge traveling in the channeled guide to hold the extension flat on the scale, locking means carried by said one slide holding the latter in adjusted position on the rib, a feed screw connected to the other of said slides for adjusting the latter relative to the first named slide, and indicating means for the second named slide.

2. A measuring device comprising a flat elongated rule body having a longitudinal rib on its upper surface and a longitudinal channeled guide at one edge also on its upper surface and parallel to the rib, said body having a scale on its upper surface between the rib and guide, a pair of slides mounted on the rib, a lateral extension on one of the slides having a sight opening selectively registering with the indicia of the scale and also having its outer edge traveling in the channeled guide to hold the extension flat on the scale, locking means carried by said one slide holding the latter in adjusted position on the rib, a feed screw connected to the other of said slides for adjusting the latter relative to the first named slide, a dial on the body, a swingable pointer pivoted on the dial, and means connecting the pointer to said second named slide for actuation by the latter.

3. A measuring device comprising a flat elongated rule body having a longitudinal rib on its upper surface and a longitudinal channeled guide at one edge also on its upper surface and parallel to the rib, said body having a scale on its upper surface between the rib and guide, a pair of slides mounted on the rib, a lateral extension on one of the slides having a sight opening selectively registering with the indicia of the scale and also having its outer edge traveling in the channeled guide to hold the extension flat on the scale, locking means carried by said one slide holding the latter in adjusted position on the rib, a feed screw connected to the other of said slides for adjusting the latter relative to the first named slide, a rotatable dial mounted on the body, means operatively connecting the dial to the feed screw, and a stationary pointer on the body coacting with the dial.

DAVID D. BROOKS.

REFERENCES CITED

The following references are of record in the file of this patent:

UNITED STATES PATENTS

| Number | Name | Date |
| --- | --- | --- |
| 51,375 | Wiley | Dec. 5, 1865 |
| 51,767 | Whalen | Dec. 26, 1865 |
| 404,305 | Richards | May 28, 1889 |
| 664,120 | Brandt | Dec. 18, 1900 |
| 764,937 | Friedman | July 12, 1904 |
| 851,507 | Fetherolf | Apr. 23, 1907 |
| 1,050,029 | Kail | Jan. 7, 1913 |
| 1,065,744 | Sutorik | June 24, 1913 |
| 1,334,217 | Blomberg | Mar. 16, 1920 |
| 1,576,797 | Schustarich | Mar. 16, 1926 |
| 1,602,490 | Homan | Oct. 12, 1926 |
| 1,829,323 | Witter et al. | Oct. 27, 1931 |
| 1,911,442 | Earl | May 30, 1933 |

FOREIGN PATENTS

| Number | Country | Date |
| --- | --- | --- |
| 86,284 | France | June 26, 1869 |
| 200,787 | Germany | July 30, 1908 |